United States Patent
Zhang et al.

(10) Patent No.: US 7,577,107 B2
(45) Date of Patent: Aug. 18, 2009

(54) PROTOCOL SPECIFICATION FOR MESSAGE-INITIATED CONSTRAINT-BASED ROUTING

(75) Inventors: Ying Zhang, Cupertino, CA (US); Markus P. J. Fromherz, Palo Alto, CA (US); Lara S. Crawford, Mountain View, CA (US); Yi Shang, Columbia, MO (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 924 days.

(21) Appl. No.: 10/453,042

(22) Filed: Jun. 3, 2003

(65) Prior Publication Data
US 2004/0246904 A1    Dec. 9, 2004

(51) Int. Cl.
H04L 12/28 (2006.01)
(52) U.S. Cl. .................. 370/255; 370/228; 370/252; 370/310; 370/328; 370/913
(58) Field of Classification Search .......... 370/228, 370/252, 255, 310, 328, 351, 400; 709/239–242; 455/422.1
See application file for complete search history.

(56) References Cited

U.S. PATENT DOCUMENTS

| | | | |
|---|---|---|---|
| 5,570,084 A | 10/1996 | Ritter et al. | 340/825.05 |
| 5,987,011 A * | 11/1999 | Toh | 370/331 |
| 6,304,556 B1 | 10/2001 | Haas | 370/254 |
| 6,310,883 B1 * | 10/2001 | Mann et al. | 370/408 |
| 6,314,093 B1 * | 11/2001 | Mann et al. | 370/351 |
| 6,535,498 B1 * | 3/2003 | Larsson et al. | 370/338 |
| 6,763,013 B2 * | 7/2004 | Kennedy | 370/338 |
| 6,816,460 B1 * | 11/2004 | Ahmed et al. | 370/238 |
| 6,940,832 B2 * | 9/2005 | Saadawi et al. | 370/328 |
| 7,002,949 B2 * | 2/2006 | Garcia-Luna-Aceves et al. | 370/351 |
| 7,006,453 B1 * | 2/2006 | Ahmed et al. | 370/255 |
| 7,177,295 B1 * | 2/2007 | Sholander et al. | 370/338 |
| 7,177,646 B2 * | 2/2007 | O'Neill et al. | 455/450 |
| 7,266,104 B2 * | 9/2007 | Belcea | 370/338 |
| 7,280,483 B2 * | 10/2007 | Joshi | 370/238 |
| 7,295,844 B1 * | 11/2007 | Moon et al. | 455/445 |
| 7,463,890 B2 * | 12/2008 | Herz et al. | 455/445 |

OTHER PUBLICATIONS

U.S. Appl. No. 10/453,174, filed Jun. 3, 2003, Ying Zhang, et al.
U.S. Appl. No. 10/453,750, filed Jun. 3, 2003, Ying Zhang, et al.

* cited by examiner

Primary Examiner—Wing F Chan
Assistant Examiner—Mark A Mais
(74) Attorney, Agent, or Firm—Fay Sharpe LLP

(57) ABSTRACT

A method is presented for message-initiated constraint-based routing for digital message communication among nodes in an ad-hoc network, in which each node includes attributes having attribute values. The method includes determining local attributes for each of the nodes in the ad-hoc network and defining constraints on the attributes. Each node is provided access to the attributes of each neighboring node, with a neighboring node being a node that is one hop away. Each message transmitted over the ad-hoc network has a message type, which includes a destination specification, route specification, and objective specification. Constraint checking and cost estimation checking are performed for each message type. The message that is routed within the network includes the address of a sending node, the address of the source node, route and destination constraints, the number of route constraints, the number of destination constraints, message identification number, sequence identification number, and routing objectives.

32 Claims, 9 Drawing Sheets

PROTOCOL SPECIFICATION FOR MESSAGE-INITIATED CONSTRAINT-BASED ROUTING

STATEMENT REGARDING FEDERALLY SPONSORED RESEARCH OR DEVELOPMENT

This work was funded in part by the Defense Advanced Research Projects Agency (DARPA), Contract #F33615-01-C-1904. The U.S. Government may have certain rights in this invention.

CROSS REFERENCE TO RELATED APPLICATIONS

The following co-pending applications, U.S. application Ser. No. 10/453,174, filed Jun. 3, 2003, titled "Learning-based Strategies for Message-initiated Constraint-based Routing," and U.S. application Ser. No. 10/453,750, filed Jun. 3, 2003, titled "Time-aware Strategy for Message-initiated Constraint-based Routing," are assigned to the same assignee of the present application. The entire disclosure of these co-pending applications are totally incorporated herein by reference in their entirety.

INCORPORATION BY REFERENCE

The following U.S. patents are fully incorporated herein by reference: U.S. Pat. No. 6,304,556 ("Routing and Mobility Management Protocols for Ad-Hoc Networks"); and U.S. Pat. No. 5,570,084 ("Method of Loose Source Routing over Disparate Network Types in a Packet Communication Network").

BACKGROUND OF THE INVENTION

This invention relates generally to communication protocols which are particularly suitable for self-reconfigurable multi-purpose communication networks, such as ad-hoc networks. More particularly, the protocol utilizes node attributes and constraints to achieve routing objectives.

Various routing mechanisms have been proposed for ad-hoc wireless networks. In general, an ad-hoc wireless sensor network has the following properties: (1) the structure of the network is unknown and may change dynamically, (2) each node has limited computation resources and lifetime, and (3) each node can obtain pieces of information from local sensors and communicate with others within a limited range. The power of such sensor networks is derived from communication, since each node is only able to sense local information with little computational resources. The routing mechanisms proposed for such networks fall into two basic categories, table-driven or source-initiated. Table-driven protocols rely on an underlying global routing table update mechanism for all nodes in the network, a mechanism that would not be energy efficient for ad-hoc dynamic networks. Source-initiated protocols, on the other hand, discover a route every time it is needed.

Existing routing protocols differ mainly in routing metrics, but all use a fixed routing objective. In most cases, routing objectives are implicitly embedded in strategies. Examples of these routing metrics include use of the shortest path, degree of association stability, signal stability or strength combined with shortest path, and information gain. Protocols also differ by destination specifications. The majority of early protocols are address-based or geographical location-based.

All existing routing protocols for wireless networks are implicitly associated with their routing strategies, which generally fall into two classes, flooding-based or search-based. Flooding-based methods begin with a route discovery phase (flooding the network), followed by a route maintenance phase for repairing disconnected routes. Flooding-based strategies are more suitable for relatively stable networks, since maintaining and repairing routes can be costly for dynamic networks. Search-based methods normally discover routes by selecting the next "best" hop at every node on the route. Routes may differ from message to message, even to the same destination node, and there is no route maintenance.

However, the above ad-hoc wireless protocols do not have theoretical results on delivery or route optimality. Distributed quality-of-service routing for ad-hoc networks have been proposed, in which a set of probes is used to find an optimal route before actual messages are sent, followed by a route maintenance phase to repair the broken route. But this approach is not suitable for dynamic networks in which there is no fixed optimal route over time.

Existing routing mechanisms for ad-hoc wireless networks have two limitations: routing objectives are fixed and embedded in strategies and quality-of-service routing does not work well for dynamic networks. It would be useful to have a general message specification mechanism to explicitly encode the routing destinations, constraints and objectives in messages, so that generic-purpose instead of metric-specific routing strategies can be applied. The separation of routing objectives and routing strategies would make it possible for network systems to change routing objectives from time to time, given different task characterizations and requirements.

SUMMARY OF THE INVENTION

Briefly stated, and in accordance with one aspect of the present invention, a method is presented for message-initiated constraint-based routing for digital message communication among nodes in an ad-hoc network, in which each node includes attributes having attribute values. The method includes determining local attributes for each of the nodes in the ad-hoc network and defining constraints on the attributes. Each node is provided access to the attributes of each neighboring node, with a neighboring node being a node that is one hop away. The minimum and maximum values of at least one attribute are estimated. Each message transmitted over the ad-hoc network has a message type, which includes a destination specification, route specification, and objective specification. Constraint checking and cost estimation checking are performed for each message type. The message that is routed within the network includes the address of a sending node, the address of the source node, route and destination constraints, the number of route constraints, the number of destination constraints, message identification number, sequence identification number, and routing objectives.

In accordance with another aspect of the present invention, a system for message-initiated constraint-based routing for digital message communication among nodes in an ad-hoc network, in which each node includes attributes having attribute values. A local attribute module determines local attributes for each of the nodes in the ad-hoc network. Remote attribute module provides access to the attributes of each neighboring node, with a neighbor node being a node one hop away. A timer module provides a time trigger function for the local attribute module and the remote attribute module. A broadcast module provides a send function for the local attribute module and a receive function for the remote attribute module. An attribute property module estimates the minimum and maximum values of at least one attribute. A constraint module defines constraints on the attributes and performs constraint checking for each message type, which includes a destination specification, route specification, and objective specification. The constraint module also performs cost estimation checking for each message type, with cost defined as the total value of at least one attribute along a message path. A routing module routes a message within the ad-hoc network, with the message including the address of a sending node, the address of the source node, route and destination constraints, the number of route constraints, the number of destination constraints, message identification number, sequence identification number, and routing objectives.

In accordance with yet another aspect of the present invention, there is described an article of manufacture in the form of a computer usable medium having computer readable program code embodied in the medium. When the program code is executed by the computer, the computer performs method steps for message-initiated constraint-based routing for digital message communication among nodes in an ad-hoc network, in which each node includes a plurality of attributes having attribute values. The method includes determining local attributes for each of the nodes in the ad-hoc network and defining constraints on the attributes. Each node is provided access to the attributes of each neighboring node, with a neighboring node being a node that is one hop away. The minimum and maximum values of at least one attribute are estimated. Each message transmitted over the ad-hoc network has a message type, which includes a destination specification, route specification, and objective specification. Constraint checking and cost estimation checking are performed for each message type. The message that is routed within the network includes the address of a sending node, the address of the source node, route and destination constraints, the number of route constraints, the number of destination constraints, message identification number, sequence identification number, and routing objectives.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Message-initiated Constraint-based Routing (MCBR) as used herein describes routing mechanisms with constraint-based destinations and objectives specified in messages. In MCBR, each node in the network has a list of attributes, whose types are predefined and known globally. Attributes can be anything from geographical locations to network bandwidths, from sensor values to internal clocks. The values of attributes can be constant, such as a node identifier or a unit cost, or can change from time to time. For example, a mobile node may change its locations; a stationary node can still obtain different sensor readings although its environment changes. A routing destination is explicitly represented by a set of constraints on attributes. This destination specification is more general than attribute-based specification, since constraints may describe any relationship or characteristic. Furthermore, in addition to destinations, local route constraints, if any, are explicitly specified. Examples of local route constraints include: avoiding a noisy area, avoiding congestion, and avoiding low-energy nodes, etc. Finally, a routing objective is explicitly stated, such as a shortest path, maximizing energy levels over the route, maximizing connectivity over the route, or minimizing congestion, etc.

Figure 1:
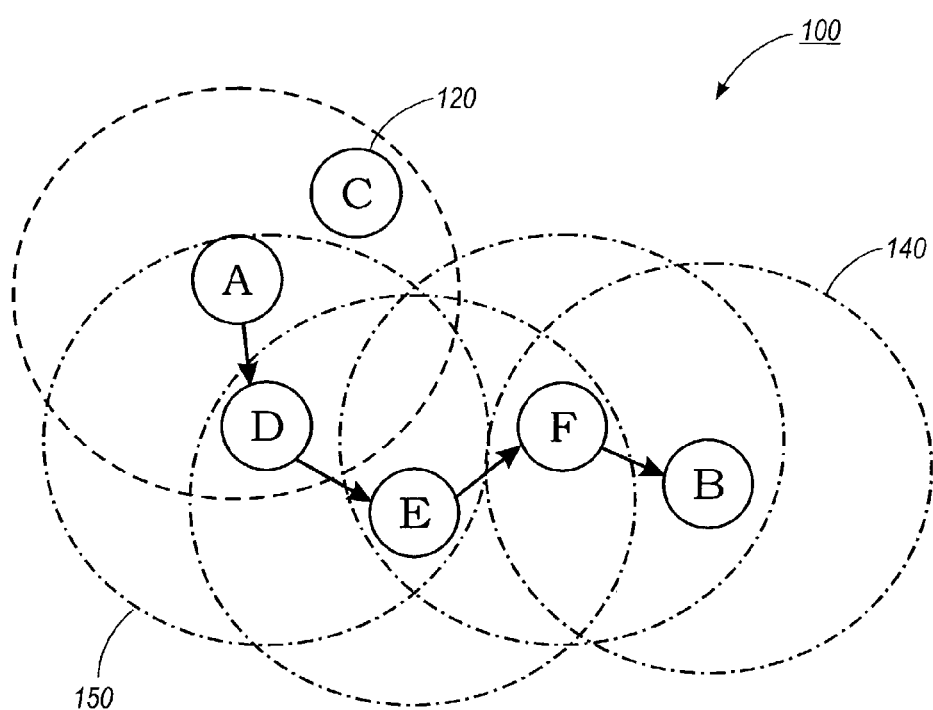
FIG. 1 is a schematic illustration of a communication network comprised of a plurality of nodes which communicate with one another in accordance with a routing scheme that includes an embodiment of the present invention.

A portion of an example network 100 that includes a plurality of communications nodes 120 labeled A, B, C, D, E, and F is illustrated in FIG. 1. Each node has a unique address, which is encoded as a number or other symbolic representations known in the art. In this example network, the routing zone for each of the nodes 120 is defined by a corresponding one of a plurality of circles 140 whose radius equals the routing zone radius. Thus, for example, if node D broadcasts, each of the nodes within its routing zone 150 will receive the broadcast message, in this example, nodes A and E. Each node 120 includes a wireless transceiver and receiver, which communicates with neighboring nodes, and a routing module that passes messages from a source to one or a set of destination nodes. Additionally, each node may have a set of sensors that can collect a variety of local information. In this example, the arrows connecting nodes A, D, E, F and B form one possible message transmittal path within the sample network. It will be appreciated that for a mobile ad-hoc network, the nodes and connections will change from time to time, due to mobility, failures, battery life, or power management.

Each node also includes attributes, which consist of a data entity having a type and a domain of values. An attribute value denotes the current value of an attribute. An attribute may be a constant, such as the node identifier or the unit energy cost for data transmission. An attribute may also be a clock that increases monotonically or a sensor reading from a light or temperature sensor, which may vary when the local environment changes. Additionally, attributes may be monitors of the node's conditions such as battery level or computations resources, or they may represent network properties such as radio strength, signal loss or reliability, connectivity with neighbors, number of routes through the node, etc. Attributes can be estimated values via calculations such as the node's geographical locations or a target's speed and direction, or they may be properties of nodes, such as being mobile or stationary, being group leader or group member, etc. Attributes may also be values passed through messages, such as the number of hops away from the source. Attribute values can be accessed via their types, with the set of attribute types predefined and known globally.

Figure 2:
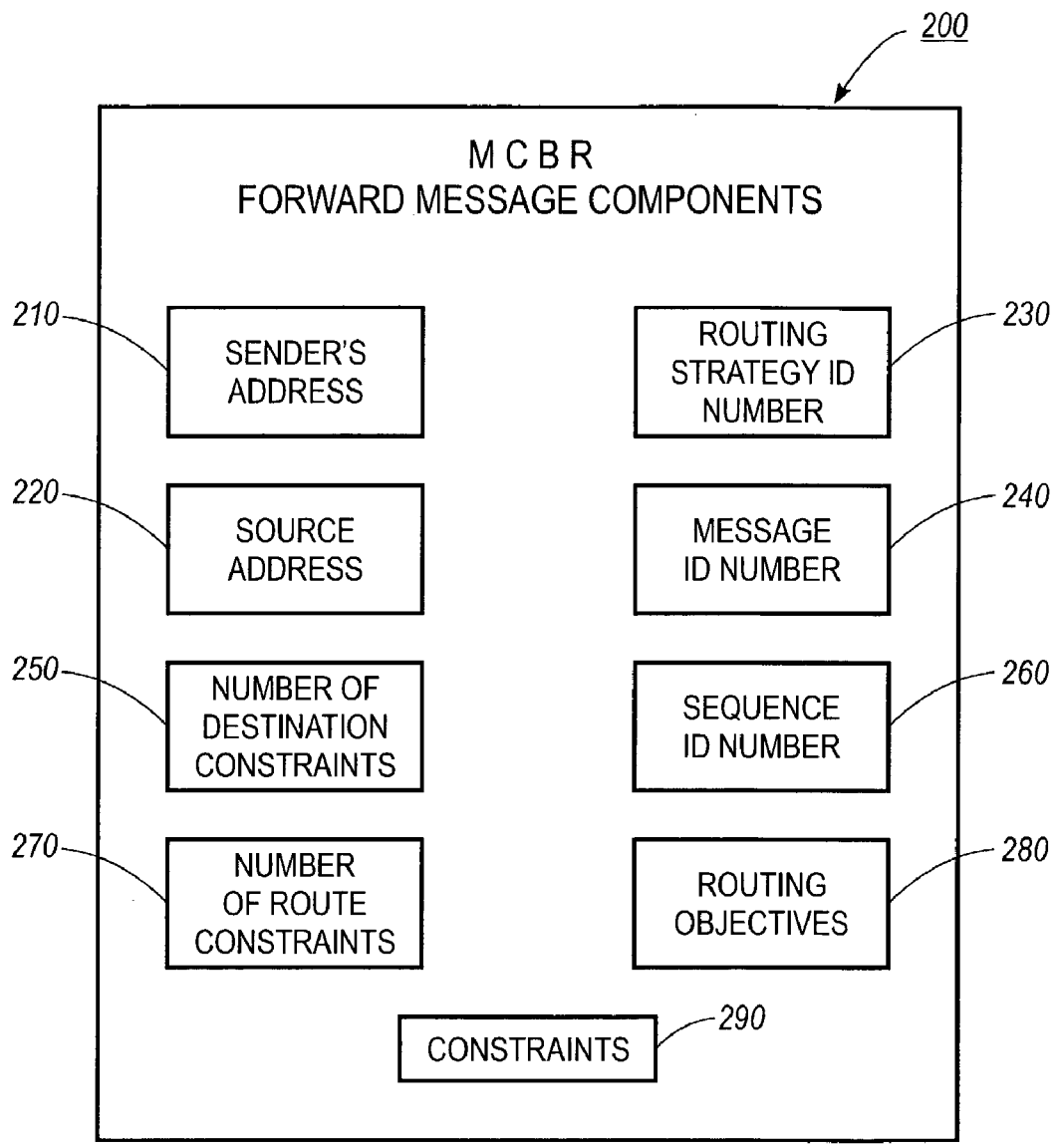
FIG. 2 is a diagram of the components in a forward message specification according to one embodiment of the present invention.

Each message sent on the network has its destination, which may be one node or a set of nodes, but existing protocols do not specify route constraints, i.e., nodes that a message should avoid while routing to its destination. In MCBR, both destinations and route constraints are specified in messages, as illustrated in FIG. 2. The MCBR forward message 200 includes various components such as the sender's address 210 and the source address 220. The sender's address 210 is necessary for forwarding link establishment or when back propagation from the destination to the source node is needed. Consequently, sender's address 210 changes, as it is updated at each node through which a message passes, but source address 220 remains constant. Each node may keep a list of entries, each of which corresponds to a type of message with a specific source, destination and route constraints. The entries are created by new messages and updated by subsequent messages of the same type.

Constraints 290 can be defined on attributes as a set of variables. Formally, a constraint C is a pair ⟨R, r⟩, where R is a set of attributes and r is a relation defined on R. If |R| is n, r is an n-ary relation. The value of C is true, or C is satisfied, at a node v, if and only if the current value of the attribute tuple located at v is in r. A simple unary constraint is a range constraint $l \leq a \leq u$, where a is an attribute, l and u are lower and upper bounds, respectively. Attribute-based specification thus becomes constraints, which can be aggregated via Boolean operations. An aggregated constraint C is a Boolean function b defined on a set of constraints, $b: B_1 \times B_2 \times \ldots B_n \rightarrow B$, where $B_i$ is the Boolean domain for constraint $C_i$. C is satisfied at node v if and only if the value of the Boolean function is true given the values of the constraints at node v. For example, if the Boolean function is logical and, the aggregated constraint is satisfied if and only if all the constraints are satisfied. If the Boolean function is logical or, the aggregated constraint is satisfied if and only if one of the constraints is satisfied. In the embodiment shown in FIG. 2, only logical and is used implicitly. However, it is possible to encode the whole Boolean function as well.

The destination of a message can be specified by a constraint or an aggregated constraint. Given a destination constraint $C_m^d$ of message m, a node v is a destination node for m if and only if $C_m^d$ is satisfied at v. The set of destination nodes, denoted by $V_m^d$, is called the destination for m. For example, address-based routing, i.e., sending a message to a node with an address $a_d$, can be represented using the destination constraint $a=a_d$ where a is the address attribute. Geographical routing, i.e., sending a message to a geographical circular region centered at $(x_0, y_0)$ within radius c can be represented using the destination constraint $(x-x_0)^2+(y-y_0)^2 \leq c$ where x and y are location attributes. Sensor-based routing, for example, sending a message to hot nodes, can be represented using the destination constraint $t \geq t_m$, where t is the temperature attribute and $t_m$ is the minimum desired temperature. Constraints can be combined to refine the destination region, for example, sending a message to a hot node within a region, etc. The number of destination constraints for each forward message is specified at 250, with the aggregated constraints for the destination being the logical and of all the constraints, for this embodiment.

The number of route constraints is specified at 270, with the aggregated constraints for the route being the logical and of all the constraints, for this embodiment. A local route constraint extends the concept of failure in networked nodes, allowing a message to be routed only via a subset of nodes satisfying the constraint. Given a local route constraint $C_m^r$ of message m, the active network of ⟨V, E⟩ for m is a subnet ⟨$V_m$, $E_m$⟩, such that $v \in V_m$ if and only if $C_m^r$ is satisfied at v and (v, w)$\in E_m$ if and only if v, w$\in V_m$ and (v, w)$\in E$. For example, a message that should avoid nodes in light areas while routing to its destination has a local route constraint $l \leq l_m$ where l is the light attribute and $l_m$ is the light intensity limit. High-priority messages and low-priority messages may be defined by different local route constraints: high-priority messages have no constraints, while low-priority messages will avoid nodes with high congestion.

An optional routing strategy identification (ID) number may be provided at 230. Both flooding-based and search-based routing strategies can be associated with MCBR. Each of the routing strategies is characterized by the following properties: (1) localization: there is no global knowledge and there is no master computing the routing table, and (2) constant memory: each node has a constant memory that does not grow with the size of the path or the size of the network. Since different strategies may lead to different performance in different situations, the selection of a strategy can be made message-by-message. In the example embodiment, the strategy ID is specified as an 8-bit number, and each strategy ID is associated with a routine. The router dispatches to the associated routine (which may correspond to a particular strategy) according to the strategy ID.

Message ID number 240 is specified as a number which corresponds to a unique type of the messages sent from its source. In this embodiment a message type includes the message components of the destination constraints, the route constraints and the objective. Similarly, sequence ID number 260 is specified as a number. The sequence ID number has two functions: (1) for flooding-based strategies, sequence number can be used to determine if the same message has been handled or not; (2) generally, sequence ID may be used to determine whether a message is lost or not, and also to assemble a series of messages to a large message according to its sequence ID.

Existing protocols, other than quality of service routing, do not explicitly specify routing objectives, which are implicitly embedded in routing strategies. MCBR explicitly specifies routing objective 280. To accomplish this, a local objective function o is defined on a set of attributes: $o: A_1 \times A_2 \times \ldots \times A_n \rightarrow R^+$, where $A_i$ is the domain of attribute i and $R^+$ is the set of positive real numbers. The value of o at a node v, denoted o(v), is $o(a_1, a_2, \ldots, a_n)$, where $a_i$ is the current attribute value of attribute i at node v. A local objective function can be a constant such as the unit energy cost. Multi-objectives can be obtained by a weighted sum of individual objectives, where the weights indicate the relative importance of individual objectives. For example, $$O(v)=\alpha o_1(v)+(1-\alpha)o_2(v),$$

where $o_1$ and $o_2$ are local objective functions, and $0<\alpha<1$.

A local objective can be aggregated over the routing path to form a global route objective. There are two types of global objectives: additive or concave. A global objective function O of a local objective function o over a path p consisting of a sequence of nodes $v_0, \ldots, v_n$ is additive if $$O(p) = \sum_{i=0}^{n} o(v_i);$$

O is concave if $$O(p) = \min_{i=0}^{n} o(v_i).$$

For example, "shortest path" is a global additive objective defined on the constant local objective, one hop cost. The objective of "energy distribution" can be defined explicitly as follows. If the current energy level e is an attribute, the function au indicating used energy can be defined as a unary function $u(e)=e^{max}-e$, and the global additive objective on local objective u, $U(p)=\Sigma_{i=0}^{n}u(v_i)$, represents the "energy distribution" metric, that is, preferring routes with more energy. As another example, the bandwidth of a path can be represented as a concave objective $B(p)=\min_{i=0}^{n}b(v_i)$ where b(v) represents the bandwidth of node v.

These two aggregation types are general. For example, convex aggregation $$O(p) = \max_{i=0}^{n} o(v_i)$$

can be represented by concave aggregations as $$O(p) = \min_{i=0}^{n}(o^{max} - o(v_i));$$

Multiplicative aggregation can be represented by additive aggregation since $$\log(\Pi o(i)) = \Sigma \log(o(i)).$$

In this example embodiment, only one additive objective is specified for the purposes of illustration.

Figure 3:
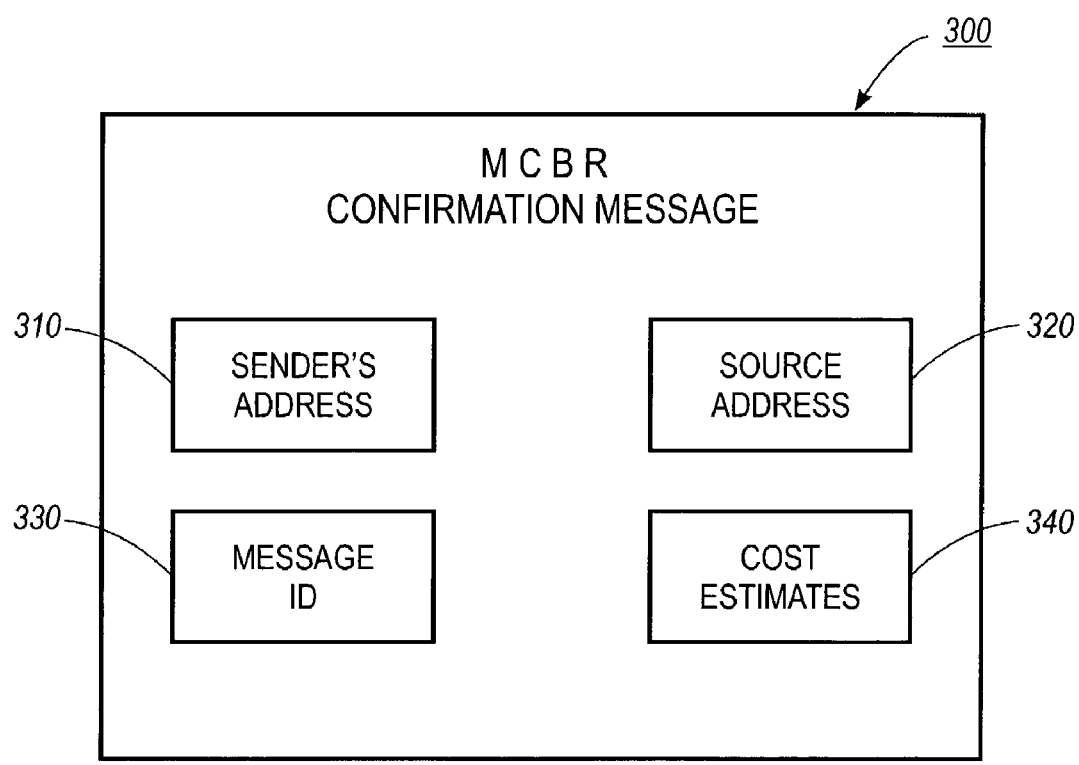
FIG. 3 is a diagram of the components in a confirmation message specification according to one embodiment of the present invention.

In MCBR, received messages may be confirmed, as illustrated in FIG. 3. Each confirmation message 300 from the destination back to the source includes various components, such as the sender's address 310, which has the same meaning as in the forward message. However, sender's address 310 is changed to the current node address, rather than remaining as the previous node address, while source address 320 remains the same as the forward message. Message ID number 330 is the same as specified in the forward message and identifies each message with its unique message type. Cost estimate 340 may be encoded as a number and provides the estimation of the objective cost from the current node to the destination of the message, where the objective is specified in the corresponding forward message.

Figure 4:
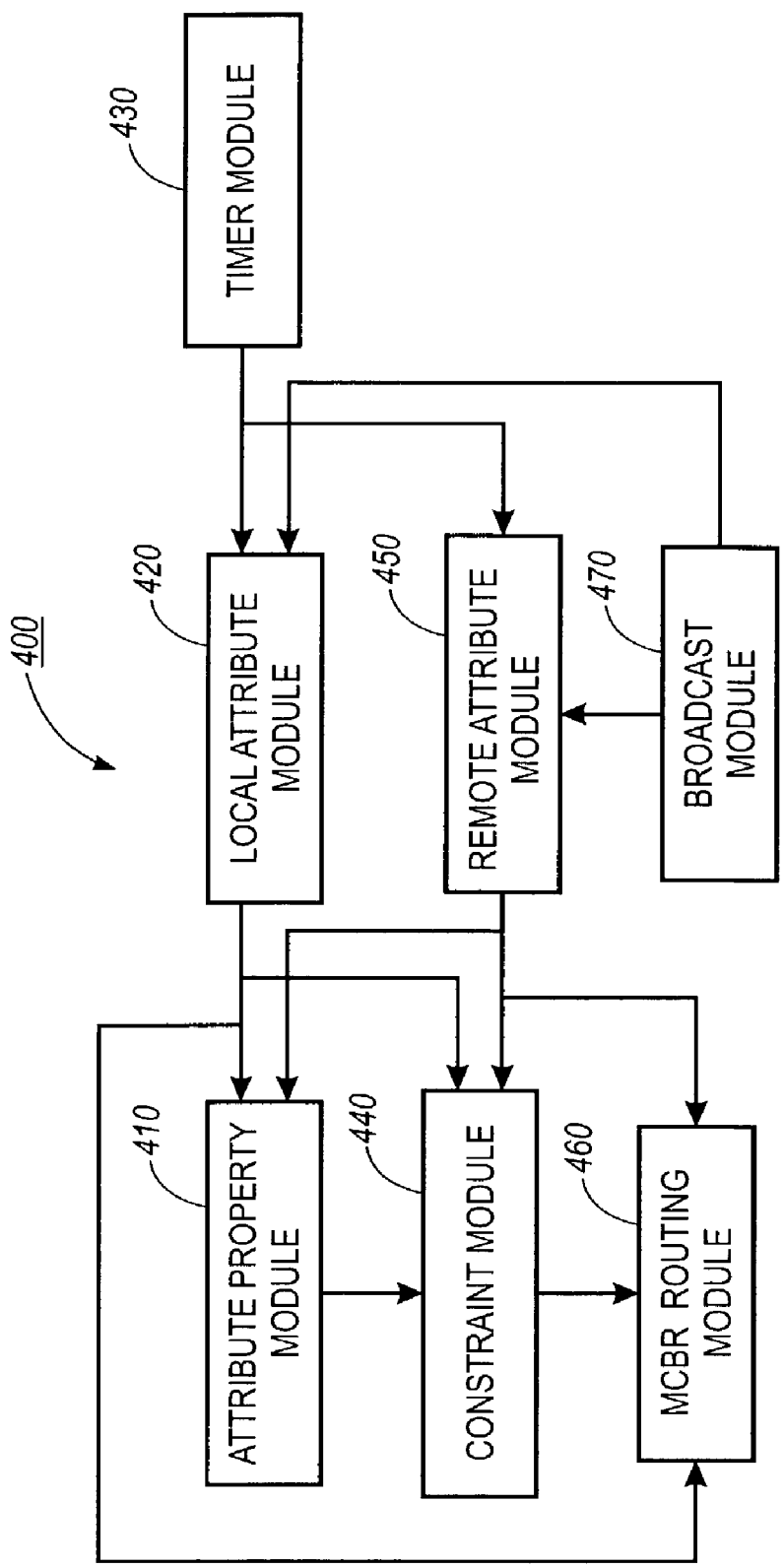
FIG. 4 is a block diagram of one embodiment of the system showing modules which may be employed in accordance with the protocol specification of the present invention.
Figure 5:
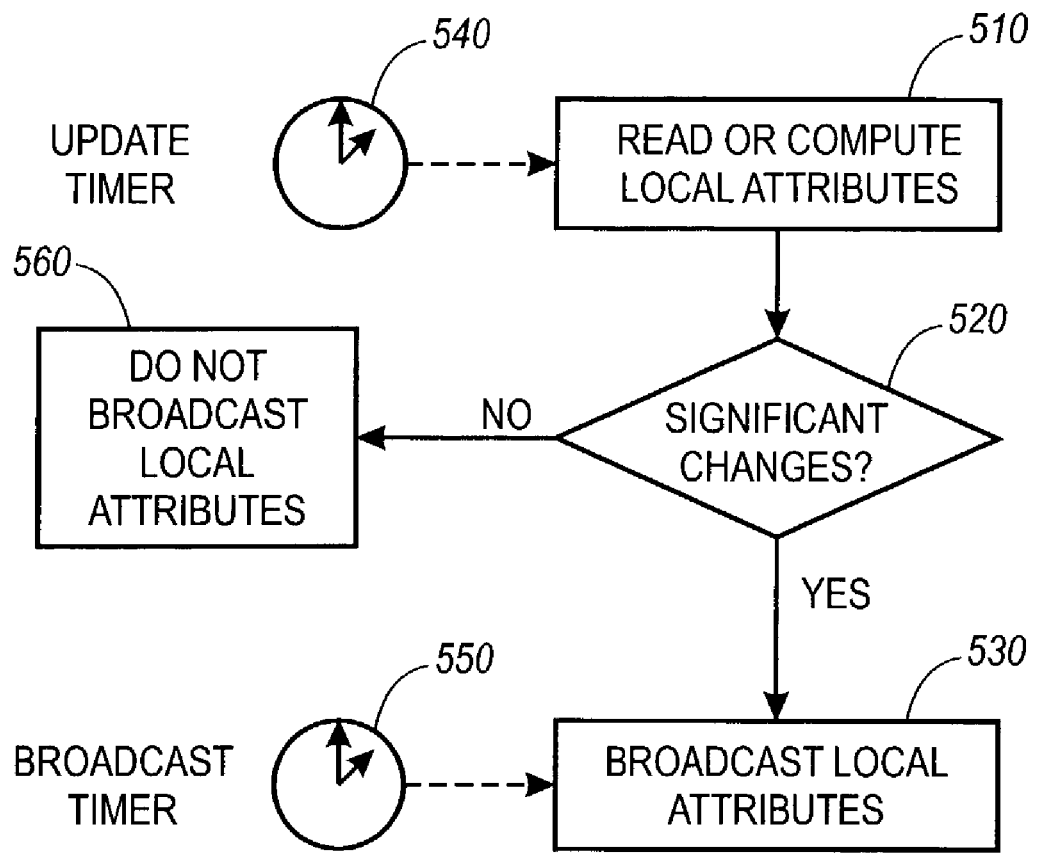
FIG. 5 is a flow chart illustrating an embodiment of the local attributes module.

Turning now to FIGS. 4 through 7, there is shown a block diagram of one embodiment of the system for protocol specification for message-initiated constraint-based routing. FIG. 4 shows a component diagram of the current embodiment, where each component is depicted as a box and each arrow, from A to B, indicates that component A provides a set of functions for component B. In system 400, Timer Module 430 provides the time trigger function for both Local Attribute Module 420 and Remote Attribute Module 450. Broadcast Module 470 provides a send function for Local Attribute Module 420 and a receive function for Remote Attribute Module 450. Local Attribute Module 420 provides local attribute access for Attribute Property Module 410, Constraint Module 440 and MCBR Routing Module 460. Remote Attribute Module 450 provides neighbor attribute access for Attribute Property Module 410, Constraint Module 440, and MCBR Routing Module 460. As shown in FIG. 5, local attribute module 420 reads or computes local attributes at 510 when triggered by update timer 540, which is included in timer module 430 in FIG. 4. At 520 a determination is made as to whether there have been any significant changes to the local attributes. If significant changes have appeared, or when triggered by broadcast timer 550, which is included in timer module 430 in FIG. 4, local attributes are broadcasted to its neighbors at 530. If significant changes have not appeared, local attributes are not broadcasted, as shown at 560. Remote attribute module 450 in FIG. 4 is illustrated in more detail in FIGS. 6 and 7.

Figure 6:
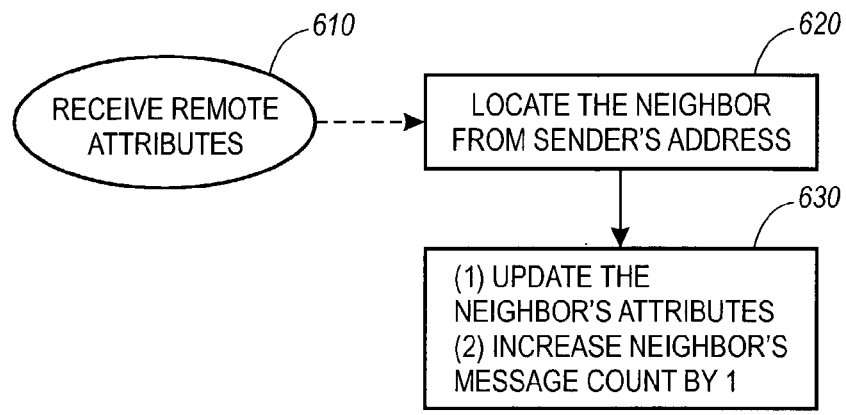
FIG. 6 is a flow chart illustrating an embodiment of the remote attributes management module, in which neighbor's attributes are updated and neighbor's message count is incremented.
Figure 7:
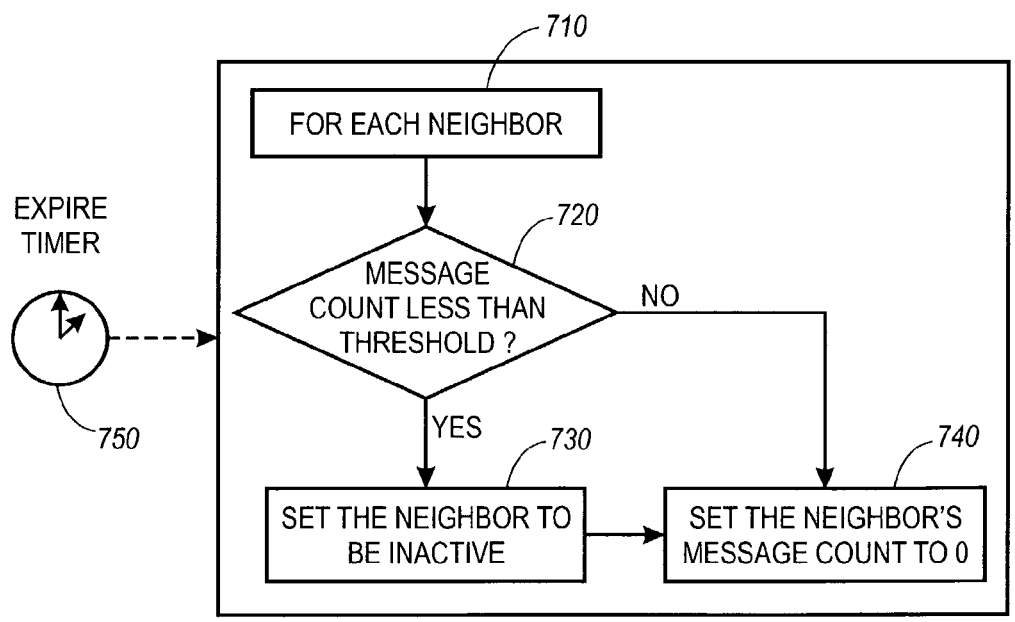
FIG. 7 is a flow chart illustrating an embodiment of the remote attributes management module shown, in which a neighbor's active state is adjusted.

In FIG. 6, a node in the system receives remote attributes at 610. The neighboring node, which has provided the remote attributes, is identified from the sender's address at 620. The receiving node then updates the neighbor's attributes within its database and increases the neighbor's message count by 1 at 630. The message count is used to record how many messages are received between the triggers of Expire timer 750. As shown in FIG. 7, whenever the Expire timer triggers, for each neighbor 710 the node checks to determine at 720 whether there are enough messages received since the last trigger. If the message count is less than the threshold, then the neighbor is set to be inactive at 730. In either case, the message count is reset to 0 at 740. The message count review is triggered by expire timer 750, which is provided by timer module 430 of FIG. 4.

Returning to FIG. 4, attribute property module 410 provides the minimum and maximum value and gradient estimation of an attribute within the neighborhood, which is used by constraint module 440. Constraint module 440 provides constraint checking and cost estimation given message type and provides this information to MCBR routing module 460. The function of routing module 460 is explained further in FIGS. 8, 9 and 10.

Figure 8:
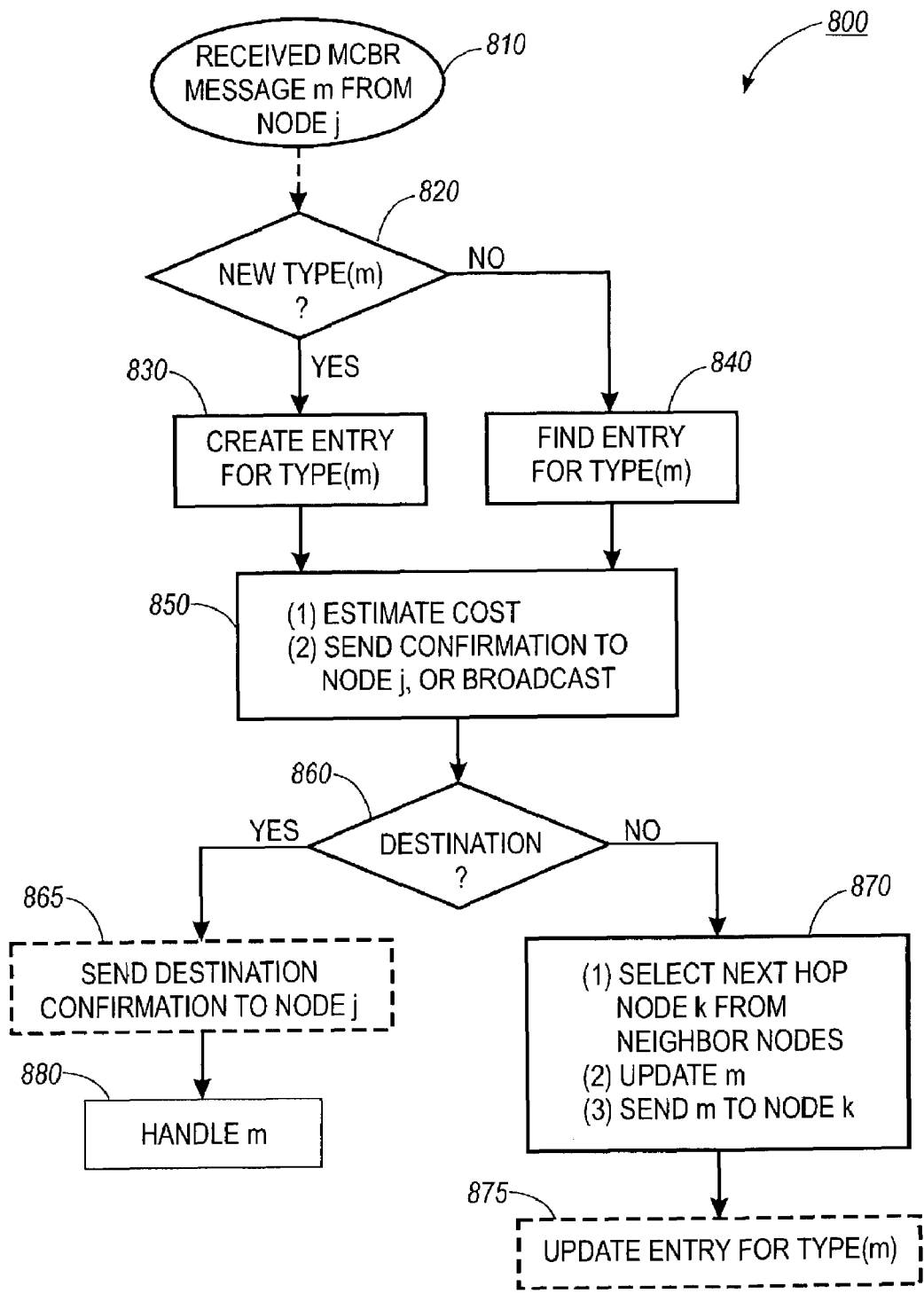
FIG. 8 is a flow chart illustrating the use of a search based strategy with an embodiment of the present invention.

Because MCBR separates routing objectives from routing strategies, various generic strategies may coexist. Since different strategies may lead to different performance in different situations, the selection of a strategy can be made message by message. Turning now to FIG. 8, there is illustrated a flow chart of a search-based strategy 800 utilized with MCBR. Generally, search-based methods use greedy algorithms or a distributed real-time search to establish a path. Search-based methods may be more energy efficient, since messages are forwarded on a single route (rather than being broadcast at every station, as with flooding-based strategies). In this embodiment, initially an MCBR message "m" is received from an identified node "j" at 810. A determination is made at 820 as to whether this is a new type message. The message type includes the destination specification, route specification, and objective specification. A new type message is one not matching message types already on record. If message "m" is a new type message, at 830 an entry for the message is created; if message "m" is not a new type message, at 840 its entry is located.

At 850 the cost for message "m" is estimated and a confirmation is either sent back to node "j" or broadcast locally to all its neighboring nodes. Cost may be defined on any attribute, for example sound, light, etc. A determination is made at 860 as to whether the destination has been reached. If the destination has been reached, the message will be handled at 880, or, optionally, a destination confirmation may be sent at 865 before the message is handled at 880. A received message is handled, if the routine corresponding to the receiving of that message is called. If a destination has not been reached, then at 870 the next hop node "k" is selected from neighbor nodes, message "m" is updated with the destination selection, and message "m" is sent to node "k". At optional 875 the entry for the type "m" message may be updated.

Figure 9:
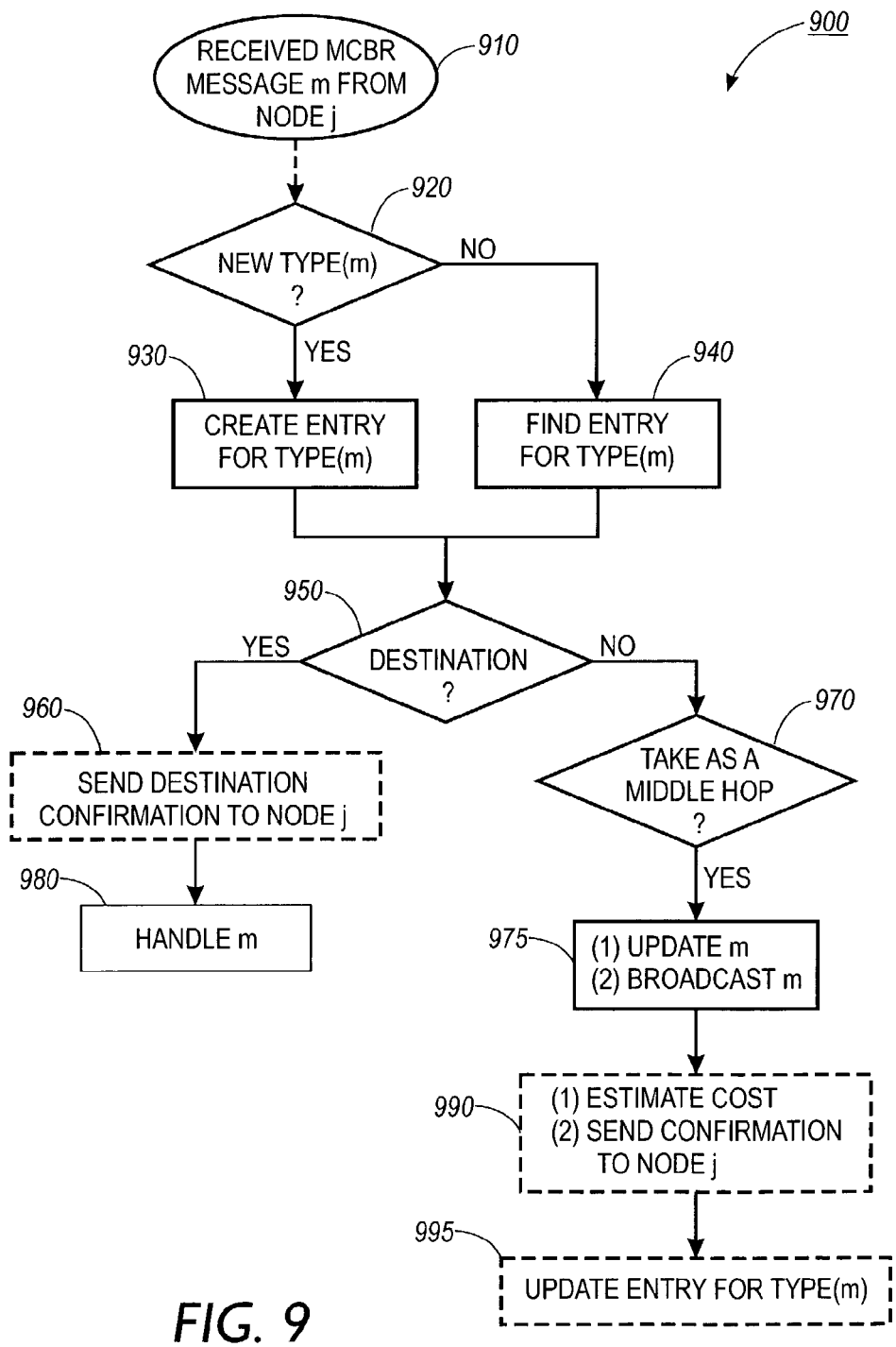
FIG. 9 is a flow chart illustrating the use of a flooding based strategy with an embodiment of the present invention.

Turning now to FIG. 9, there is illustrated a flow chart of a flooding-based strategy 900 utilized with MCBR. Flooding-based methods generally begin with a broadcast to locate the destinations, then provide a route maintenance phase after the route discovery phase to establish routes and cope with broken routes during communication. Flooding-based strategies can be energy expensive for sending small size messages infrequently from a source to a destination. Maintaining routes can be costly for dynamically changing environments as well. In the illustrated embodiment, initially an MCBR message "m" is received from an identified node "j" at 910. A determination is made at 920 as to whether this is a new type message. If message "m" is a new type message, at 930 and entry for the message is created; if message "m" is not a new type message, at 940 its entry is located. A determination is made at 950 as to whether the destination has been reached. If the destination has been reached, the message will be handled at 980, or, optionally, a destination confirmation may be sent at 960 before the message is handled at 980. If the destination has not been reached, at 970 a determination is made as to whether the message is at a node intermediate to the final destination. If it is a middle hop, at 975 the message "m" is updated and broadcast to all its neighbor nodes. Optionally, the message cost from the current node to its destination is estimated at 990 and a confirmation is sent to node "j". Another optional operation, updating the entry for the message type, may be made at 995.

Figure 10:
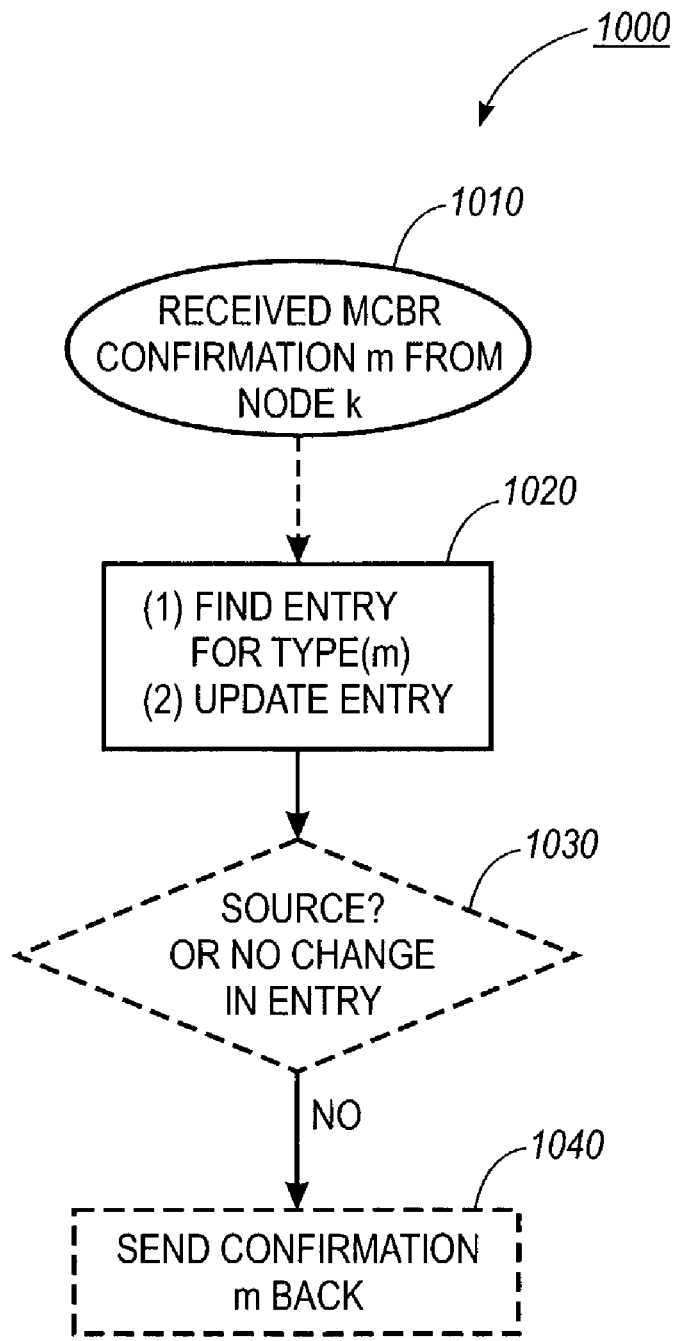
FIG. 10 is a flow chart illustrating an embodiment for the handling of confirmation MCBR messages according to an embodiment of the present invention.

In those cases in which the destination node sends a confirmation message back to the originating node, the confirmation message is processes according to the flow chart illustrated in FIG. 10. Confirmation management process 1000 begins with receipt of the MCBR confirmation message "m" from node "k" at 1010. At 1020 an entry is located for the type of the message and the entry for the message is updated. Optionally, a determination may be made at 1030 as to whether the current node is a source node or if there is no change in the message entry. If either of the above is true, there is no further back propagation. Otherwise, the confirmation message "m" may be sent back to its previous forwarding node 1040. Note that in this case, the forwarding routine should save the link to its previous node.

While the present invention has been illustrated and described with reference to specific embodiments, further modification and improvements will occur to those skilled in the art. For example, while a general framework for message strategies is described herein, various specific strategies are contemplated, such as learning-based strategies and time-aware strategies. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A method of message-initiated constraint-based routing for digital message communication among nodes in an ad-hoc network, wherein each node includes a plurality of attributes having attribute values, comprising:

determining attributes for each of the nodes in the ad-hoc network;

providing access to the attributes of each neighboring node within the ad-hoc network, wherein a node is a neighboring node of another node where said neighboring node is a node one hop away from a current node within the ad-hoc network;

explicitly encoding a message with routing destinations, routing constraints and routing objectives;

storing a list of entries created by new messages and updated by subsequent messages of the same type, wherein each entry corresponds to one in a plurality of message types and remains in storage for the duration of the node;

estimating the minimum and maximum values of at least one attribute within the plurality of attributes;

defining a plurality of constraints on the plurality of attributes, wherein said plurality of constraints comprises at least one route constraint and at least one destination constraint;

performing constraint checking for each message type, wherein each of the message types;

performing cost estimation checking for each said message type, wherein cost is defined as the total value of at least one of the plurality of attributes along a message path;

selecting at least one routing strategy;

routing a message within the ad-hoc network according to said at least one strategy, said message including the address of a sending node, wherein the sending node is the most recent node to send the message, the address of the source node, wherein the source node is the node from which the message originated, route and destination constraints, the number of route constraints, the number of destination constraints, message identification number, sequence identification number, and routing objectives; and recording within the node information from each message type that passes through the node regarding both active and inactive routes, either contained in the message or regarding the message, or both, wherein the recording includes storing the information in a database for the duration of the node and wherein the source address, routing and destination constraints and routing objectives are explicitly encoded within the nodes of the ad hoc network to enable the network to change routing objectives as necessary in order to implement a generic-purpose routing strategy, wherein said routing objectives and routing strategy are pre-network discovery constraints.

2. The method of message-initiated constraint-based routing according to claim 1, wherein determining local attributes comprises reading said local attributes.

3. The method of message-initiated constraint-based routing according to claim 1, wherein determining local attributes comprises computing said local attributes.

4. The method of message-initiated constraint-based routing according to claim 1, wherein determining local attributes further comprises:

determining whether significant changes have occurred to said local attributes;

providing local attributes to neighbor nodes if at least one significant change has occurred; and providing local attributes to neighbor nodes if triggered by a timer.

5. The method of message-initiated constraint-based routing according to claim 1, wherein providing access to the attributes of each neighboring node comprises:

receiving the attributes of at least one neighbor node, wherein said neighbor node is identified from its address;

updating said attributes of said at least one neighbor node within the database of said first node;

increasing the message count from said neighbor node by one; and performing a message count review, wherein said message count review checks the number of messages received between triggers of an expire timer.

6. The method of message-initiated constraint-based routing according to claim 5, wherein performing the message count review comprises:

checking the number of messages received since the previous trigger event;

setting the neighbor node as inactive and then as zero if the message count is less than a threshold value; and resetting the neighbor node as zero if the message count in not less than said threshold value.

7. The method of message-initiated constraint-based routing according to claim 1, wherein said message further comprises a routing strategy identification number for identifying a routing strategy type.

8. The method of message-initiated constraint-based routing according to claim 1, wherein said destination constraints route a message communicated among nodes within the ad-hoc network to not less than one node location.

9. The method of message-initiated constraint-based routing according to claim 1, wherein said destination constraints route a message communicated among nodes within the ad-hoc network to a plurality of nodes within the ad-hoc network.

10. The method of message-initiated constraint-based routing according to claim 1, wherein said route constraints permit a message to be routed only via a specified subset of nodes within the ad-hoc network.

11. The method of message-initiated constraint-based routing according to claim 7, wherein said routing strategy type comprises a flooding-based routing strategy.

12. The method of message-initiated constraint-based routing according to claim 7, wherein said routing strategy type comprises a search-based routing strategy.

13. The method of message-initiated constraint-based routing according to claim 1, wherein said message identification number identifies the source of not less than one forward message.

14. The method of message-initiated constraint-based routing according to claim 13, wherein said message identification number further comprises identifying components of said forward message.

15. The method of message-initiated constraint-based routing according to claim 11, wherein said flooding-based routing strategy comprises:

receiving not less than one forward message from not less than one source node within the ad-hoc network;

determining whether said forward message is of a new type;

identifying an appropriate entry for said forward message of a new type;

reviewing the destination of said forward message and processing said forward message if said destination has been reached; and reviewing the destination of said forward message and updating said forward message with identification of the intermediate node through which said forward message has passed and broadcasting said forward message to at least one next node if said destination has not been reached.

16. The method of message-initiated constraint-based routing according to claim 15, further comprising estimating cost of said forward message, wherein cost is defined as total value of at least one attribute along a message path.

17. The method of message-initiated constraint-based routing according to claim 15, further comprising sending a confirmation message to said source node.

18. The method of message-initiated constraint-based routing according to claim 12, wherein said search-based routing strategy comprises:

receiving not less than one forward message from not less than one source node within the ad-hoc network;

determining whether said forward message is of a new type;

identifying an appropriate entry for said forward message of a new type;

estimating a cost for transmission of said forward message;

reviewing the destination of said forward message and processing said forward message if said destination has been reached; and reviewing the destination of said forward message and selecting a next node for receipt of said forward message, updating said forward message with identification of the intermediate node through which said forward message has passed, and transmitting said forward message to said next node if said destination has not been reached.

19. The method of message-initiated constraint-based routing according to claim 18, further comprising sending a destination confirmation to said source node.

20. The method of message-initiated constraint-based routing according to claim 1, further comprising estimating the minimum and maximum changes in at least one attribute among a plurality of nodes.

21. A system of message-initiated constraint-based routing for digital message communication among nodes in an ad-hoc network, wherein each node includes a plurality of attributes having attribute values, comprising:

local attribute module means for determining attributes for each of the nodes in the ad-hoc network;

remote attribute module means for providing access to the attributes of each neighboring node within the ad-hoc network, wherein a node is a neighboring node of another node where said neighboring node is a node one hop away from a current node within the ad-hoc network, and wherein providing access includes storing information about the attributes of at least one neighboring node in a database and recording within the node information either contained in the message or regarding the message, or both, wherein the recording includes storing the information in a database and wherein the source address, routing and destination constraints and routing objectives are explicitly encoded within the nodes of the ad hoc network;

timer module for providing a time trigger function for said local attribute module and said remote attribute module;

broadcast module for providing a send function for said local attribute module and a receive function for said remote attribute module;

attribute property module for estimating both a minimum and a maximum value of at least one attribute within the plurality of attributes;

constraint module for defining a plurality of constraints on the plurality of attributes, wherein said plurality of constraints includes at least one route constraint and at least one destination constraint, performing constraint checking for each message type, wherein each of the message types includes a destination specification, route specification, and objective specification explicitly encoded therein, and performing cost estimation checking for each said message type, wherein cost is defined as the total value of at least one of the plurality of attributes along a message path; and routing module for routing a message within the ad-hoc network, said message including the address of a sending node, wherein the sending node is the most recent node to send the message, the address of the source node, wherein the source node is the node from which the message originated, route constraints, destination constraints, the number of route constraints, the number of destination constraints, message identification number, sequence identification number, and routing objectives and wherein the local attribute module means, remote attribute module means, timer module, broadcast module, attribute property module constraint module, and routing module are configured to ensure that routing objectives and routing strategies of the system are separated to enable potential routing objective changes and implementation of a generic-purpose routing strategy, wherein said routing objectives and routing strategy are pre-network discovery constraints.

22. The system for message-initiated constraint-based routing according to claim 21, wherein said local attribute module comprises:

means for reading or computing local attributes under direction of an update timer;

means for determining significant changes to local attributes; and means for broadcasting said significant changes to nodes within the ad-hoc network.

23. The system for message-initiated constraint-based routing according to claim 21, wherein said remote attribute module comprises:

means for receiving said set of remote attributes of not less than one neighbor node;

means for identifying each of said neighbor nodes that is the source of said received set of remote attributes;

means for updating said attributes of said neighbor nodes within a database of a receiving node; and means for increasing the message count for messages received from each said neighbor nodes.

24. The system for message-initiated constraint-based routing according to claim 23, further comprising:

means for determining if said message count for each neighbor node is less than a threshold value;

means for identifying a neighbor node as inactive if said message count is less than said threshold value;

means for setting a neighbor node message count to zero if said received message count is greater than said threshold value; and means for setting a neighbor node message count to zero if said neighbor node has been identified as inactive.

25. The system for message-initiated constraint-based routing according to claim 21, wherein said message further comprises a routing strategy identification number for identifying a routing strategy type.

26. The system for message-initiated constraint-based routing according to claim 21, wherein said destination constraints route a message communicated among nodes within the ad-hoc network to not less than one node location.

27. The system for message-initiated constraint-based routing according to claim 21, wherein said destination constraints route a message communicated among nodes within the ad-hoc network to a plurality of nodes within the ad-hoc network.

28. The system for message-initiated constraint-based routing according to claim 21, wherein said route constraints permit a message to be routed only via a specified subset of nodes within the ad-hoc network.

29. The system for message-initiated constraint-based routing according to claim 25, wherein said routing strategy type comprises a flooding-based routing strategy.

30. The system for message-initiated constraint-based routing according to claim 25, wherein said routing strategy type comprises a search-based routing strategy.

31. The system for message-initiated constraint-based routing according to claim 21, further comprising means for estimating both a minimum and a maximum change in at least one attribute among a plurality of nodes within the ad-hoc network.

32. An article of manufacture comprising a computer element having a computer program code stored on a computer readable medium which, when said program code is executed by said computer element causes said computer element to perform method steps for message-initiated constraint-based routing for digital message communication among nodes in an ad-hoc network, wherein each node includes a plurality of attributes having attribute values, the method comprising:

determining attributes for each of the nodes in the ad-hoc network;

providing access to the attributes of each neighboring node within the ad-hoc network, wherein a node is a neighboring node of another node where said neighboring node is a node one hop away from a current node within the ad-hoc network;

explicitly encoding a message with routing destinations, routing constraints and routing objectives;

storing a list of entries created by new messages and updated by subsequent messages of the same type, wherein each entry corresponds to one in a plurality of message types and remains in storage for the duration of the node;

estimating the minimum and maximum values of at least one attribute within the plurality of attributes;

defining a plurality of constraints on the plurality of attributes, wherein said plurality of constraints comprises at least one route constraint and at least one destination constraint;

performing constraint checking for each message type, wherein each of the message types includes a destination specification, route specification, and objective specification;

performing cost estimation checking for each said message type, wherein cost is defined as the total value of at least one of the plurality of attributes along a message path;

utilizing cost estimation to converge on an optimal message path;

selecting a routing strategy;

routing a message within the ad-hoc network, said message including the address of a sending node, wherein the sending node is the most recent node to send the message, the address of the source node, wherein the source node is the node from which the message originated, route and destination constraints, the number of route constraints, the number of destination constraints, message identification number, sequence identification number, and routing objectives; and recording within the node information from each message type that passes through the node regarding both active and inactive routes, either contained in the message or regarding the message, or both, wherein the recording includes storing the information in a database for the duration of the node and wherein the source address, routing and destination constraints and routing objectives are explicitly encoded within the nodes of the ad hoc network in order to implement a generic-purpose routing strategy, wherein said routing objectives and routing strategy are pre-network discovery constraints.

* * * * *